Sept. 24, 1935.  G. J. SEISS  2,015,387
SIREN
Filed April 25, 1934
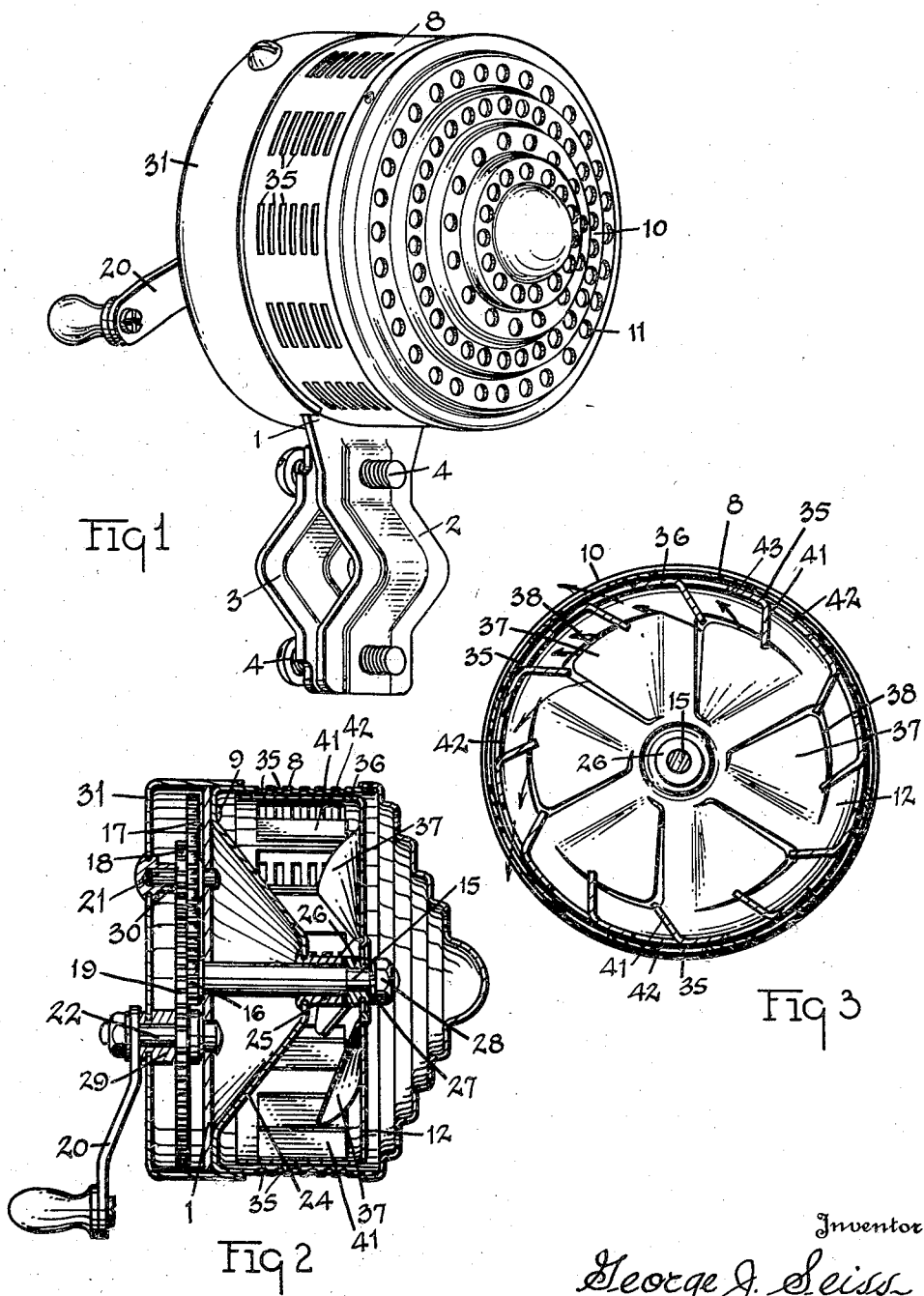
Inventor
George J. Seiss
By Faust F. Crampton
Attorney Patented Sept. 24, 1935

2,015,387

UNITED STATES PATENT OFFICE 2,015,387

SIREN

George J. Seiss, Toledo, Ohio

Application April 25, 1934, Serial No. 722,335

5 Claims. (Cl. 116—147)

My invention has for its object to provide an exceedingly efficient siren, particulary constructed for use as a signal means and wherein the parts are so formed and interrelated that relatively strong air currents may be produced and directed through a large number of openings with the result that an exceedingly loud signal or sound will be produced at a relatively slow speed of operation of the sound controlling, revolving part of the siren.

The invention may be contained in siren structures of different forms, and to illustrate a practical application of the invention, I have selected a siren as an example of such structures and shall describe the selected structure hereinafter. The particular siren selected is shown in the accompanying drawing.

Fig. 1 of the drawing is a perspective view of the siren referred to. Fig. 2 is a view of a section of the siren shown in Fig. 1, taken in the plane of the axis of the rotation of the member that produces the air currents. Fig. 3 is a view of the section of the shell and the rotative member that produces the air currents, the shell having openings through which the air currents periodically move and are intercepted by the rotative member.

The siren is supported upon a suitable plate 1 of a relatively thick gauge metal and which protrudes from the body of the siren to form the bracket member 2. A coacting clamping member 3 may be connected to the bracket 2 by means of suitable clamping screws 4 for securing the siren in position on any supporting member, such as the arm of a bicycle. A cylindrical shell 8 is connected to the plate 1 by means of the rivets 9. The shell 8 may be closed by a suitable cap 10 having a plurality of openings 11 through which air may be moved to or from the shell by the rotatable air-propelling member 12.

The air-propelling member 12 is rotated by means of a shaft 15 to which the member 12 is connected and to which is also connected the pinion 16. The pinion 16 is driven by the gear wheel 17. The gear wheel 17 is connected to the pinion 18, which is driven by the gear wheel 19, which is connected to the crank 20, which is manually operated. Consequently the speed of rotation of the crank 20 is stepped up through the chain of gears to produce a markedly higher rate of rotation of the cylindrical propeller member 12.

The shaft 15 and the gear wheel supporting shafts 21 and 22 have bearings in the supporting plate 1. The shaft 15 is also supported by means of a bearing member 25 secured in the bottom 24 of the cylindrical shell 8, the bottom 24 of the shell 8 being disposed remote from the plate 1 and operates to rigidly support the shaft 15 in its relation to the plate 1. The center of the bottom 24 is provided with an opening into which the end of the bearing member 25 is inserted and riveted in position. The shaft 15 is located in an opening formed in the supporting plate 1 and in the bearing 25. The air-propelling member 12 has a collar 26 that abuts the end of the bearing sleeve 25, and the propeller 12 is connected to the shaft 15 by means of the lock washer 27 and the nut 28.

The spindles 21 and 22 of the gear wheels 17, 18, and 19 are not only rotatably supported in the plate 1 but also in bearing members 29 and 30 that are secured to a cover member 31 that fits the exterior of the shell 8 and the edge of the plate 1. It encloses the transmission gear formed by the gear wheels 17, 18, and 19.

The shell 8 is provided with a plurality of openings 35 located in the side wall of the shell and having lengths materially greater than their widths, their lengths extending circumferentially. They form slits disposed in parallel relation and are divided into sets, the sets spaced from each other by a distance substantially equal to the length of the slits or openings 35, forming thereby a large number of narrow openings through which air may be forced by the propelling member to produce, by the movement of the air through the slitted openings, a sharp tone that varies in its pitch according to the periodicities of air movement through the openings.

The air current and the movement of the air through the openings 35 is produced and controlled by the propeller 12, which is made in the form of a cup having a side exterior wall 36, the exterior diameter of which approximates the interior diameter of the side wall of the shell 8, its length also approximating the length of the side wall of the shell 8. The bottom of the cup-shaped propeller is provided with screw propeller vanes 37 that are struck up from the metal of the bottom of the propeller, the bottom being cut along V-shaped lines to form the slits 38. The free edges of the vanes 37 are bent inwardly so that the points of the V-portions project well into the interior of the cup-shaped propeller 12, as shown in the Fig. 2, and thus produce displacement of a relatively large volume of air upon rotation of the propeller member 12. They operate to draw the air through the interior of the propeller member 12 and the shell 8 and operate centrifugally to direct the air radially and spread the air over the areas of the sets of slits or openings 35 formed in the shell 8. The bottom 24 of the shell 8 is formed to be conical and protrudes interiorly with respect to the side of the shell to the interior of the propelling member 12 to reduce the air space within the propelling member 12. The conical shaped bottom of the shell 8 serves to greatly increase the velocity of the air set in motion by the propelling member 12. Thus, the conical shaped bottom 24 of the shell 8 coacts with the vanes 37 to enable distribution of air over the areas of the slitted openings 35. Also, the conical construction of the bottom 24 confines the air currents and prevents the formation of eddies within the propeller member and the shell, and thus, in combination with the vanes, operates to maintain the high velocity of the air currents through the slits 35. The air current is also increased in its velocity and its outward pressure by means of the vanes 41 formed from the metal of the side wall 36 of the propeller member. The vanes 41 are formed by striking the metal of the side wall inward to form the openings 42, which are spaced from each other by portions 43 that have a width measured circularly substantially the same as the length of the openings 35. The vanes 41 are of such dimension and so angularly displaced from the side wall 36 that they extend to substantially the outer edges of the vanes 37 formed in the propeller member. The openings 42 are substantially the same in length as the openings 35 and have a width as measured parallel to the axis of rotation of the propeller member substantially the same as the width of the sets of the openings 35 as measured in the same direction. Thus, the portions 43 and the openings 42 of the propeller member 12 operate, upon rotation of the propeller member 12, to periodically open and close the openings 35, and thus, according to the rate of movement of the propeller member 12, produce a definite periodicity of air movement through the openings 35. Consequently the pitch of the tone produced by the revolution of the propeller member is raised or lowered according to the rate of movement of the propeller, and the intensity of the sound is increased by reason of the interrelationship of the conical bottom and of the slitted openings of the shell through which the air is forced by the coaction of the vanes of the bottom of the cup-shaped propeller member and the vanes of the side wall of the propeller member.

I claim:

1. In a siren, a cylindrical shell having a plurality of openings, a cylindrical, cup-shaped propeller member located within the shell and having screw propeller vanes struck up from the bottom of the said propeller member and inwardly extending vanes protruding from the wall of the propeller member and operative to propel air radially, the wall of the propeller member having openings, the openings of the propeller member and the portions of the propeller member between its openings operative to alternately open and close the openings of the shell, and means for driving the said propeller member.

2. In a siren, a shell having a plurality of openings having lengths that are equal and many times greater than their widths and forming narrow slits and divided into sets, the openings of each set located in parallel relation and terminating in two lines parallel to the axis of the shell, the sets of openings spaced from each other circumferentially substantially the length of the openings as measured circumferentially with respect to the shell, a cup-shaped propeller member located in the shell and having screw propeller vanes struck up from the bottom of the said propeller member, the wall of the propeller member having openings having lengths measured circumferentially substantially the same as the length of the openings of the said shell and widths substantially the same as the width of the said sets, and means for driving the said propeller member.

3. In a siren, a cylindrical shell having a plurality of slitted openings having lengths that are equal and many times greater than their widths and divided in sets, the sets spaced from each other the length of the openings as measured circumferentially and the openings of each set disposed in parallel relation with reference to the wall of the shell, a cylindrical, cup-shaped propeller member located within the shell and having screw propeller vanes struck up from the bottom of the said propeller member and inwardly extending vanes protruding from the wall of the propeller member and inclined from the radii extending to their outer edges and coacting to propel air in the same direction as the said screw propeller vanes, the wall of the propeller member having openings located contiguous to the outer ends of the inwardly extending vanes, the openings of the propeller member having a length as measured circumferentially substantially the same as the openings of the shell as measured circumferentially, each opening in the propeller member being spaced from the next opening circumferentially of said member a distance substantially equal to the length of the openings of the shell, and the openings of the propeller member having a width substantially equal to the total width of the said sets of openings, and means for driving the said propeller member.

4. In a siren, a cylindrical shell having a plurality of openings of equal length, a cylindrical cup-shaped propeller member located within the shell and having screw propeller vanes struck up from the bottom of the said propeller member, and inwardly extending vanes protruding from the wall of the propeller member and coactive to propel air in the same direction as the said screw propeller vanes, the wall of the propeller member having openings located contiguous to the outer ends of the inwardly extending vanes, the openings of the propeller member having a length measured circumferentially the same as the openings of the shell, each opening in the propeller member being spaced from the next opening circumferentially of said member a distance substantially equal to the length of the openings of the shell, the said shell having a conical, inwardly protruding portion extending to near the center of the bottom of the said propeller member for confining and directing the currents from the screw propeller vanes to the said openings of the propeller and the shell, and means for driving the said propeller member.

5. In a siren, a cylindrical shell having a plurality of openings of equal length, a cylindrical cup-shaped propeller member located within the shell and having screw propeller vanes struck up from the bottom of the said propeller member and inwardly extending vanes protruding from the wall of the propeller member and inclined to the radii extending to their outer edges and coactive to propel air in the same direction as the said screw propeller vanes, the said inwardly extending vanes protruding to substantially the outer edges of the said screw propeller vanes, the wall of the propeller member having openings located contiguous to the outer ends of the inwardly extending vanes, the openings of the wall of the propeller member having a length measured circumferentially the same as the openings of the shell, each opening in the propeller member being spaced from the next opening circumferentially of said member a distance substantially equal to the length of the openings of the shell, and means for driving the said propeller member.

GEORGE J. SEISS.